(No Model.) 2 Sheets—Sheet 1.
G. H. WATERS.
VALVE GEAR FOR STEERING APPARATUS.
No. 600,698. Patented Mar. 15, 1898.
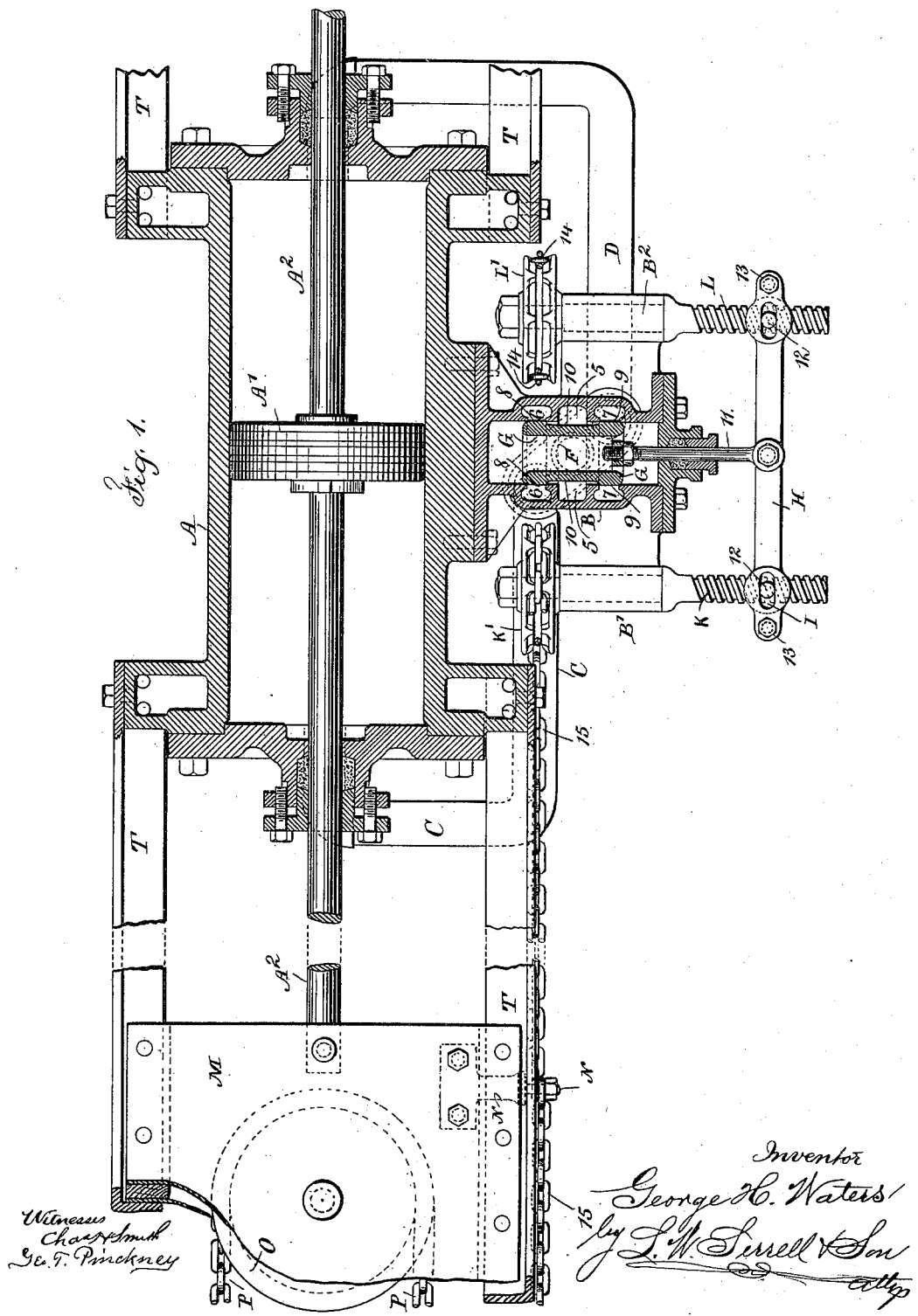

(No Model.) 2 Sheets—Sheet 2.
G. H. WATERS.
VALVE GEAR FOR STEERING APPARATUS.
No. 600,698. Patented Mar. 15, 1898.
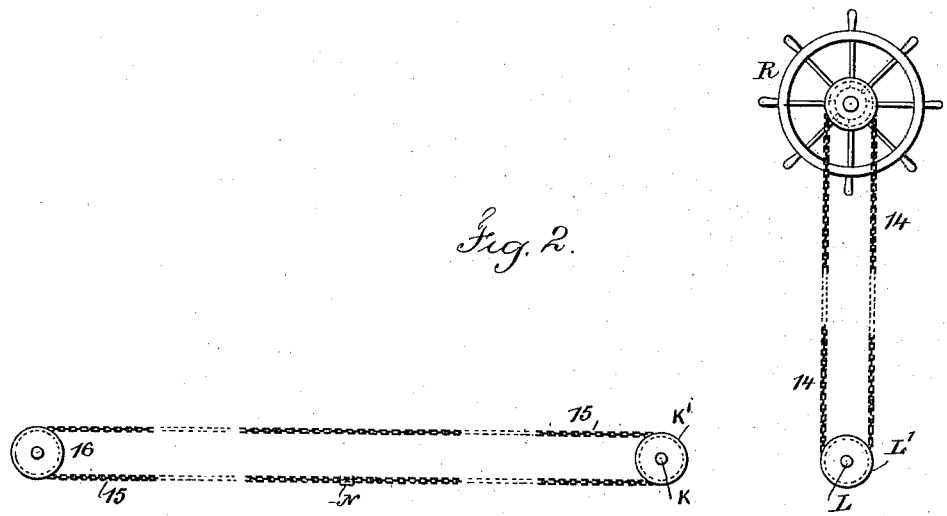
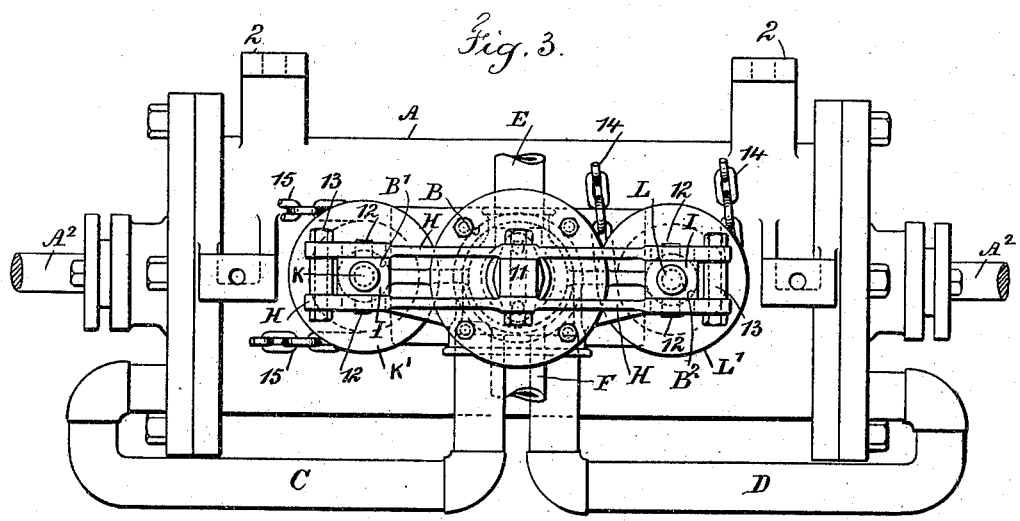

UNITED STATES PATENT OFFICE.

GEORGE H. WATERS, OF JERSEY CITY, NEW JERSEY.

VALVE-GEAR FOR STEERING APPARATUS.

SPECIFICATION forming part of Letters Patent No. 600,698, dated March 15, 1898.

Application filed August 30, 1897. Serial No. 649,964. (No model.)

*To all whom it may concern:*

Be it known that I, GEORGE H. WATERS, a citizen of the United States, residing at Jersey City, in the county of Hudson and State of New Jersey, have invented an Improvement in Valve-Gear for Steering Apparatus, &c., of which the following is a specification.

In this improvement a cylinder having a piston and piston-rod is made use of for giving motion to the chains or rods leading to the tiller or rudder, and the piston is moved in one direction or the other in steering. A similar motion is available in elevators or other structures that require to be moved first in one direction and then the other and held in the position to which the parts are moved.

The present improvement relates especially to the valve-gear employed for admitting the steam, water, or other fluid under pressure to the cylinder and arresting the supply and exhaust, so as to hold the piston in any position to which it may be moved.

I employ a cylindrical piston-valve and its stem and two screws and a lever for acting upon the stem. One of these screws is moved by the pilot or attendant, and the other screw is moved automatically by the action of the piston and piston-rod, so that when the valve is opened by the pilot or attendant the fluid under pressure gives motion to the piston and the parts attached, and this motion automatically closes the valve, thereby arresting the movement at any place at which the motion given by the pilot or attendant is stopped, and the motion can be given in either one direction or the other.

In the drawings, Figure 1 is a sectional plan view. Fig. 2 is a diagram illustrating the connections, and Fig. 3 is an elevation endwise of the valve-stem.

The cylinder A is of suitable size, and it is provided with flanges by which it may be supported or sustained. I have shown flanges at 2 2 for sustaining such cylinder, and it may be bolted upon the under side of a deck in a position convenient to the pilot-house, or it may be supported by said flanges 2 in any convenient manner. The valve-chest B is preferably at one side of the cylinder, and it is represented as a separate casting bolted on; but it may be integral with the cylinder, and from this valve-chest suitable ports extend to the ends of the cylinder A. I have shown pipes C and D as extending from the valve-chest to the respective ends of the steam-cylinder and forming ports for such cylinder; but I do not limit myself in the construction of the ports leading from the valve-chest to the ends of the cylinder, and E indicates the steam or pressure pipe, and F the exhaust, and the supply-pipe E leads into the valve-chest and the exhaust-pipe F communicates with the exhaust-port 5 of the steam-chest.

The devices hereinafter described for moving the valve are available with any character of a slide-valve; but I prefer to employ a tubular piston-valve G within the cylindrical valve-chest, and 6 and 7 are the ports of the valve-chest leading to the pipes or ports C and D, that extend to the ends of the cylinder A. The valve G has surfaces 8 and 9, that are sufficiently wide to cover the ports 6 and 7 and thereby hold whatever fluid under pressure fills the cylinder A at the opposite sides of the piston, thereby holding the piston stationary, and when the valve is moved in one direction the fluid-pressure acts through either of the ports 6 or 7 to move the piston A', and simultaneously the opposite port is opened through the recess 10 of the valve G to the exhaust-port 5 and exhaust-pipe F.

In order to move the valve G, the rod 11, passing through a suitable gland, is made use of, and upon the end of this rod is pivoted a lever H, which is preferably made in two parts, one at each side of the cylindrical pivot end of the rod 11, and there are nuts I between the ends of the levers, having pivot-pins 12 in slots in the two parts of the lever H, and it is advantageous to connect the outer ends of the levers by bolts and tubular washers, as represented at 13.

Through the nuts I the screws K and L pass, and these are supported and rotate in the tubular extensions B' and B² of the valve-chest, and they are provided on their opposite ends with chain-wheels K' L', and around the wheel L' is a chain 14, passing to the steering-wheel in the pilot-house, or in case of an elevator over an idler, so that the attendant can manipulate this chain 14, and thereby turn the pulley L' and the screw L, and around the pulley K' is a chain 15, passing around a stationary idler 16 at a convenient distant position, and the arm N is connected with and moved by the piston-rod A², and thereby the chain 15 is moved in either one direction or the other, according to the direction of motion of the piston, and the screw K turned either one way or the other way.

I have represented at M a cross-head upon the piston-rod, which cross-head slides upon the guides T and carries the arm N, and also a pulley O, with the chain P extending to the tiller for steering or to the article to be moved, and it is to be understood that usually there will be upon the other end of the piston-rod A² a similar cross-head M, guides T, pulley, and chain for giving motion to the device to be moved in the opposite direction.

It will now be understood that when the chain 14 is moved and the screw L turned the lever H will be moved in either one direction or the other, the nut upon the screw K forming a pivot for the lever, and by the movement of the lever the valve G will be moved in either one direction or the other and admit the fluid under pressure to act in the cylinder A and give motion to the piston A' and connected parts, and by this motion the chain 15 automatically rotates the screw K, and the direction in which the screw K acts is such that it will move the lever H, the nut around the screw L forming a fulcrum, so that the valve G is automatically moved in the opposite direction to the motion received from the screw L, and thereby the valve will close both of the ports 6 and 7 and arrest the movement of the piston; but so long as the screw L is being turned the piston will be moved in either one direction or the other, but the motion will stop when the movement of the chain 14 is stopped, thus holding the piston and the parts connected with it at any place to which it may be moved and placing the movement of the piston in either one direction or the other entirely under the control of the attendant.

It is to be understood that the chain-wheels K and L may be of any desired character, according to the chain that is made use of. I have represented such wheels as having peripheral recesses adapted to the links of a cable-chain, as this character of chain is usually the most convenient for being led in any desired direction around guide-pulleys. Hence in a steering apparatus the steering-wheel illustrated at R can be in any desired location in relation to the steering apparatus and its chain-wheel L'.

I claim as my invention—

1. The combination with the cylinder, piston and connected parts that are to be moved by fluid-pressure, of a valve for controlling the admission and discharge of the fluid, two screws and a lever for moving the valve, a chain-wheel and chain and connection to the piston-rod for moving one of the screws and closing the valve, and a chain-wheel and chain actuated by hand for moving the other screw and opening the valve, substantially as set forth.

2. The combination with a cylinder, piston and connected parts that are to be moved by fluid-pressure, of a valve-chest and piston-valve for controlling the admission and discharge of the fluid, two screws and a lever for moving the valve, automatic mechanism for rotating one of the screws by a connection to the piston-rod and mechanism for moving the other screw by hand, substantially as specified.

3. The combination in a valve mechanism for a steering or analogous apparatus, of a valve-chest and ports, a piston-valve having surfaces adapted to cover the ports leading to the cylinder, a valve-rod, a double lever pivoted upon the end of the valve-rod, nuts and pivot-pins in slots in the lever, screws passing through the nuts, mechanism for rotating one of the screws by hand and opening the valve, and automatic mechanism receiving its motion from the movement of the engine for rotating the other screw and closing the valve, substantially as set forth.

4. The combination in an engine for moving a rudder or other device in one direction or the other, of a valve and ports for admitting a fluid under pressure to act in the engine, a screw and mechanism for actuating the same by hand, and a connection from such screw to the valve for opening the valve in one direction or the other, a second screw and automatic mechanism receiving its motion from the movement of the piston and acting to close the valve and confine the fluid-pressure in the engine, substantially as set forth.

Signed by me this 27th day of August, 1897.

GEO. H. WATERS.

Witnesses:
GEO. T. PINCKNEY,
E. E. POHLÉ.